US011972064B2

United States Patent
Kuhne et al.

(10) Patent No.: US 11,972,064 B2
(45) Date of Patent: Apr. 30, 2024

(54) ERGONOMIC LAYOUT OPTIMIZATION SYSTEMS AND METHODS

(71) Applicant: Hewlett-Packard Development Company, L.P., Spring, TX (US)

(72) Inventors: Felipe Kuhne, Porto Alegre (BR); Werner Marcel Hansen, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/894,688

(22) Filed: Aug. 24, 2022

(65) Prior Publication Data
US 2024/0069649 A1 Feb. 29, 2024

(51) Int. Cl.
*G06F 3/02* (2006.01)
*G06F 1/16* (2006.01)

(52) U.S. Cl.
CPC .......... *G06F 3/0227* (2013.01); *G06F 1/1664* (2013.01)

(58) Field of Classification Search
None
See application file for complete search history.

(56) References Cited

U.S. PATENT DOCUMENTS

| | | | | | |
|---|---|---|---|---|---|
| 9,962,083 | B2* | 5/2018 | Horseman | ................ | A61B 5/00 |
| 10,251,476 | B2* | 4/2019 | Glöckl | .................... | A47B 21/03 |
| 2013/0321579 | A1* | 12/2013 | Firkus | .................... | H04N 23/90 |
| | | | | | 348/46 |
| 2016/0213140 | A1* | 7/2016 | Koch | ....................... | G06F 3/011 |
| 2017/0296099 | A1* | 10/2017 | Hancock | .................. | A61B 5/11 |
| 2017/0303680 | A1* | 10/2017 | Glöckl | ................. | E01F 8/0023 |
| 2019/0334907 | A1* | 10/2019 | Rodden | .................... | H04L 67/54 |
| 2020/0029707 | A1* | 1/2020 | Lukas | ..................... | G06F 3/011 |
| 2020/0382656 | A1* | 12/2020 | Ogawa | ................. | G06F 3/1236 |
| 2023/0099570 | A1* | 3/2023 | Bobert | ..................... | G06N 5/04 |
| | | | | | 345/633 |

* cited by examiner

Primary Examiner — Ariel Mercado
(74) Attorney, Agent, or Firm — Quarles & Brady LLP

(57) ABSTRACT

According to an example, a method for determining an ergonomic layout for a plurality of secondary devices comprises detecting the plurality of secondary devices, determining characterizing data for each of the detected secondary devices, the characterizing data comprising a type of secondary device and a location of a secondary device with respect to a primary device, determining a workspace layout based on the determined location, determining an ergonomic layout in which the primary device and the plurality of secondary devices are distributed in accordance with the type of secondary device, comparing the ergonomic layout to the workspace layout, and determining a set of changes for the plurality of secondary devices based on the comparison.

15 Claims, 3 Drawing Sheets

ERGONOMIC LAYOUT OPTIMIZATION SYSTEMS AND METHODS

BACKGROUND

Users of primary electronic devices (e.g., computing devices) may use the primary devices along with secondary devices. These additional secondary devices may provide the primary device with additional functionalities or capabilities, such as larger screen size, enhanced control of the primary device, or enhanced communication for the primary device. Also, some types of secondary devices may improve a user's experience when a primary device is in use.

BRIEF DESCRIPTION OF DRAWINGS

Features of the present disclosure are illustrated by way of example and are not limited in the following figure(s), in which like numerals indicate like elements, in which.

DETAILED DESCRIPTION

Figure 1:
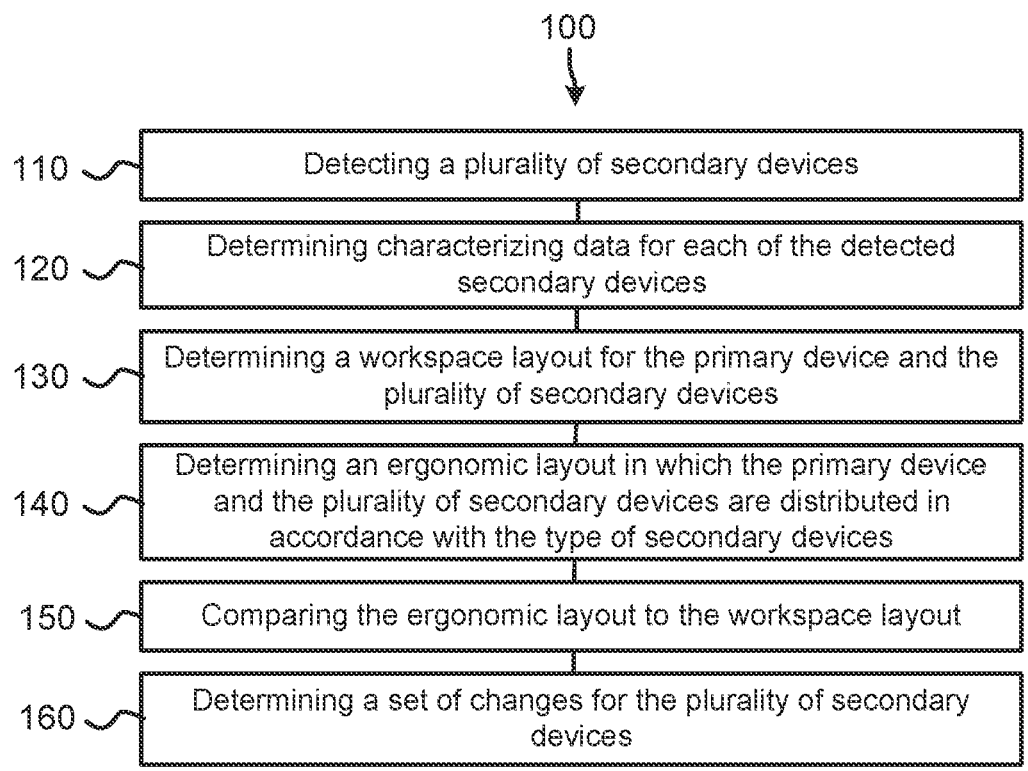
FIG. 1 shows a method for determining a set of changes for a plurality of secondary devices, according to an example of the present disclosure.

For simplicity and illustrative purposes, the present disclosure is described by referring mainly to examples. In the following description, numerous specific details are set forth in order to provide a thorough understanding of the present disclosure. It will be readily apparent, however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to.

Computing devices may be used along with additional devices so as to expand their capabilities and functionalities, or to improve a user's experience when a user makes use of the computing device. In some examples, a computing device may act as a primary device and the additional devices may act as secondary devices. These secondary devices may be located at different distances and relative positions with respect to the primary device, thereby resulting in a wide variety of different layouts. In some examples, a user of a primary device may set up a workspace by distributing the primary device and the plurality of secondary devices in a workspace layout. In some examples, workspace layouts may result in a bad posture for the user with respect to the devices, thereby risking the user's health. Workspace layouts that potentially lead to bad postures are referred to as non-ergonomic layouts.

Eventually, wrong postures with respect to the devices of the workspace layout may adversely affect the user of a primary device. Among others, wrong postures may cause headaches, pain in the neck, pain in the shoulders, or eye strain. Furthermore, users of computing devices may not be aware of a wrong posture until they start to experience one of the above-mentioned symptoms.

As explained above, secondary devices assist the user in improving or expanding the capabilities and functionalities of a primary computing device. In some examples, secondary devices may provide the primary computing device with additional screen size (e.g., an external monitor or multiple monitors), may provide alternative ways to control the primary device (e.g., external keyboards, external mice, or external joysticks), or may provide the primary device with enhanced communication capabilities (e.g., external microphones, webcam, or speakers). Examples of secondary devices comprise keyboards, mice, desk lamps, chairs, armrests for chairs, backrests for chairs, seats for chairs, stools, desks, docking stations, monitors, monitor supports, speakers, headphones, microphones, webcams, printers, drawing tablets, and smartphones.

As used herein, the term "computing device" will be used to refer to electronic systems having processor resources and memory resources. Examples of computing devices comprise a laptop computer, a notebook computer, a desktop computer, networking devices such as routers or switches, and mobile devices such as smartphones, tablets, personal digital assistants, smart glasses, and wrist-worn devices.

Disclosed herein are methods, systems, and computing devices for determining an ergonomic layout for a user of a plurality of devices. The plurality of devices comprises computing devices, peripherals to work along with the computing devices, and accessories to improve the user experience when using the computing devices.

In some examples, a non-ergonomic layout may be determined based on the type of secondary devices available in a workspace. Each of the secondary devices may be used for a different purpose, and hence, a relative position (and location) with respect to a primary computing device may be based on the type of secondary device. For instance, in use, an external monitor and a mouse are positioned differently with respect to a computing device. Hence, when a user sets up a workspace, an appropriate ergonomic position for a first type of secondary device (for instance, a 27-inch monitor) may result in a non-appropriate ergonomic position for a second type of secondary device (e.g., a keyboard or a mouse).

In some other examples, non-ergonomic layouts may further depend on the anthropometric characteristics of the user and a relative position of the user with respect to the primary computing device. Anthropometric characteristics may comprise at least one of the user's height, the user's wingspan, the length of a user's leg, and the length of the user's arms.

According to an example, a workspace layout may be determined for the primary computing devices and the secondary devices. To locate each of the primary device and the secondary devices in the workspace layout, the secondary devices may comprise at least one wireless transmitter to emit signals and the primary computing device may comprise a receiver to receive signals emitted by the wireless transmitters of the secondary devices. Examples of wireless transmitters and receivers that may assist in determining a workspace layout comprise BLUETOOTH transmitters and receivers, BLUETOOTH low energy transmitters and receivers, and ZIGBEE transmitters and receivers. In some examples, the wireless transmitter may be a transmitter with BLUETOOTH 5.1. In some other examples, the wireless transmitter may be a transmitter with BLUETOOTH 5.2 or 5.3.

BLUETOOTH low-energy transmitters are a type of transmitter that broadcast an identifier to nearby portable devices. In some examples, BLUETOOTH low energy transmitter may include BLUETOOTH beacons to transmit a universally unique identifier (UUID) or a globally unique identifier (GUID) towards a nearby device. BLUETOOTH low energy transmitters may take a wide variety of form factors, including coin cell devices, USB sticks, USB dongles, and BLUETOOTH low energy tags. In some examples, BLUETOOTH low energy transmitters may be used to determine a relative position with respect to a target device. For instance, in an example, each secondary device in a workspace may be equipped with a BLUETOOTH low energy transmitter and a primary computing device includes a BLUETOOTH receiver to receive the signals emitted by the transmitters. In some examples, a controller of the primary device may determine a relative position of the secondary devices with respect to the primary computing device based on the signals received by the transmitters. In an example, the transmitters may transmit data defining a type of secondary device. In an example, the type of secondary device may be associated with a UUID or a GUID. In some other examples, the receiver of the primary computing device may be a BLUETOOTH 5-based receiver (e.g., 5.1, 5.2, or 5.3), and the receiver may determine an angle of arrival (AoA) for the received signals. The angle of arrival (AoA) of the signal may provide information about the direction of the signal. Also, in some other examples, a strength of the received signal may be determined by parsing the received signal to obtain a received signal strength indication (RSSI) value. Based on the angle of arrival (AoA) and the strength of the received signal, a position of the secondary device with respect to the primary device may be determined.

Referring now to FIG. 1, a method 100 for determining an ergonomic layout is shown. At block 110, method 100 comprises detecting a plurality of secondary devices. In an example, detecting the plurality of secondary devices may comprise receiving beacon signals from the plurality of secondary devices. For instance, each of the secondary devices may include at least one wireless transmitter to emit beacon signals. At block 120, method 100 comprises determining characterizing data for each of the detected secondary devices, the characterizing data comprising a type of secondary device and a location of a secondary device with respect to a primary device. In some examples, the characterizing data may be determined via characteristics of the signals received from the secondary devices, such as a received signal strength indication (RSSI) value, a universally unique identifier (UUID), and an angle of arrival (AoA).

At block 130, method 100 comprises determining a workspace layout for the primary device and the plurality of secondary devices. In some examples, determining the workspace layout comprises positioning the secondary devices with respect to the primary device based on the determined locations and the types of secondary devices determined at block 120. At block 140, method 100 comprises determining an ergonomic layout in which the primary device and the plurality of secondary devices are distributed in accordance with the type of secondary devices. In an example, distributing the plurality of secondary devices may comprise determining an ergonomic position for a secondary device with respect to the primary device based on an ergonomic rule (for instance, a relative position or a relative location) associated with the type of secondary device. In an example, a range of ergonomic positions may be determined for each of the secondary devices and distributing the plurality of secondary devices may comprise overlapping the range of ergonomic positions of the secondary devices. In some examples, determining the ergonomic layout at block 140 may comprise determining an ergonomic score for the workspace layout, and determining arranging the secondary devices with respect to the primary device such that the ergonomic score is greater than a threshold value. In some examples, an ergonomic score may be in the form of a set of ergonomic rules associated with different types of secondary devices and positions of the devices with respect to the primary device. In some examples, the set of ergonomic rules may be stored in a look-up table (LUT). Then, at block 150, method 100 comprises comparing the ergonomic layout to the workspace layout and, at block 160, method 100 comprises determining a set of changes for the plurality of secondary devices based on the comparison.

In some examples, detecting the plurality of secondary devices at block 110 comprises parsing the signals received from the secondary devices. Accordingly, in some examples, detecting the plurality of secondary devices at block 110 comprises receiving beacon signals from the plurality of secondary devices. To determine the characterizing data (i.e., the type of device and the location of the device), method 100 may further comprise parsing the received beacon signals to obtain received signal strength indication (RSSI) values for the received signals, angle of arrival (AoA) values for the received signals, and universally unique identifier (UUID) values associated with the received beacon signals. In some examples, determining the characterizing data at block 120 comprises determining the type of secondary device based on the universally unique identifier and determining the location of the secondary devices based on the received signal strength indication values and the angle of arrival values.

In other examples, comparing the ergonomic layout to the workspace layout at block 150 may comprise determining an ergonomic score for each of the secondary devices and, determining a non-ergonomic layout when the overall ergonomic score of the secondary devices is lower than a threshold ergonomic score. Then, at block 160, determining a set of changes for the plurality of secondary devices may comprise determining a minimum number of changes to obtain an ergonomic score greater than the threshold ergonomic score.

In some other examples, method 100 may further comprise displaying the set of changes for the plurality of secondary devices in a user interface. In some examples, displaying the set of changes may comprise creating a virtual map defining a three-dimension positioning for each of the secondary devices and displaying the virtual map in the user interface.

According to some examples, an ergonomic layout for a plurality of secondary devices may be based on at least one of user's preferences, anthropometric characteristics of the user, and workspace boundaries. In some examples, a user may prefer to use the primary device in a preferred configuration (e.g., standing up in front of the primary device, sitting down in a chair with a backrest, or sitting down on a stool) or at a preferred location (e.g., in front of the primary device or in front of a preferred secondary device). In other examples, the ergonomic layout may be determined based on anthropometric data of the user, such as a user's wingspan, a user's height, or a user's leg length. In some other examples, a surface defining the workspace may include some unavailable regions, thereby decreasing the available space of the surface. Accordingly, the ergonomic layout may be restricted to the available regions after defining the boundaries in the workspace.

Figure 2:
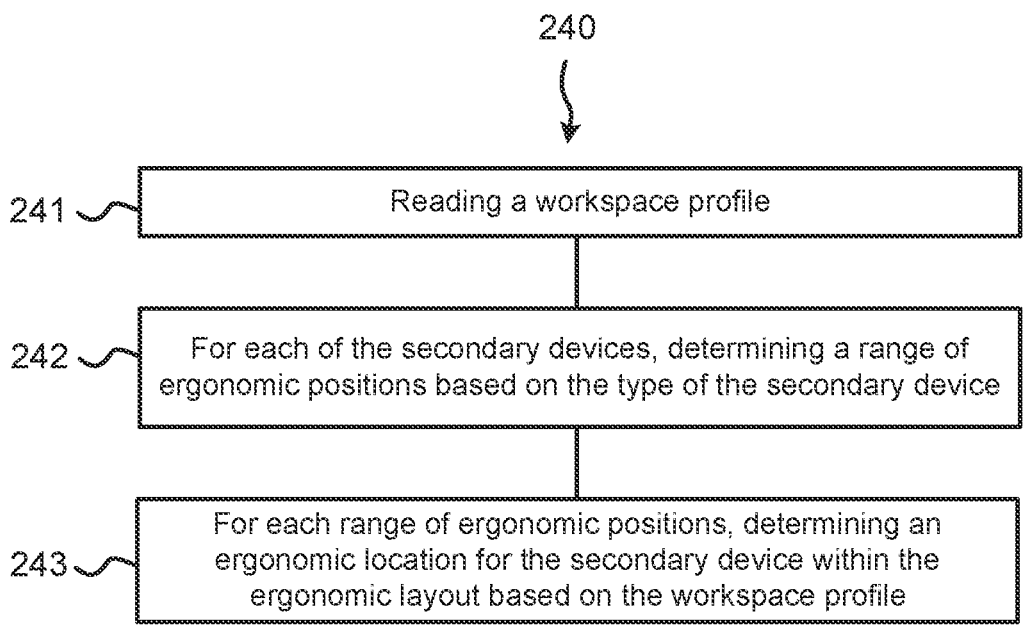
FIG. 2 shows a method for determining a location of a secondary device within an ergonomic layout based on a workspace profile, according to an example of the present disclosure.

Referring now to FIG. 2, a method 240 for determining a location of a secondary device within an ergonomic layout based on a workspace profile is shown. At block 241, method 240 comprises reading a workspace profile. The workspace profile may comprise at least one of a user's preferred location within the workspace, a user's height, a user's wingspan, a user's preferred configuration, and workspace boundaries. As previously explained, a workspace layout may not be ergonomic for every type of user because of the physical characteristics of the user and his/her preferences. At block 242, method 240 comprises for each of the secondary devices, determining a range of ergonomic positions based on the type of the secondary device. Then, at block 243, method 240 comprises for each range of ergonomic positions, determining an ergonomic location for the secondary device within the ergonomic layout based on the workspace profile. In some examples, block 140 of the method 100 previously explained in FIG. 1 may comprise blocks 241 to 243 of method 240.

In some examples, users may define workspace profiles by inputting data about the workspace and/or their anthropometric characteristics. In other examples, an imaging device may be used to capture an image (or a group of images), and based on the image(s), a workspace profile may be determined. In an example, the imaging device may determine a user's preferred location within the workspace, the available space on a working surface, or user's anthropometric characteristics. In some examples, imaging devices may determine a location of the user's eyes with respect to the imaging device, and based on the location, a workspace profile may be determined. In other examples, a shoulders width or the length of the user's arms may be determined using the imaging device. Based on the determination, at least one of the user's height, the user's wingspan, the user's preferred configuration, and workspace boundaries may be determined. In an example, the imaging device may be part of the primary device (for instance, a webcam of a computing device). However, in other examples, the imaging device may be provided as an external device operatively connected to the primary device.

As explained above, secondary devices may include at least one wireless transmitter so as to transmit signals to a receiver of a primary device. In some examples, a single secondary device may include multiple wireless transmitters so as to define the dimensions of the secondary device and a relative position of the secondary device with respect to the primary device. For instance, a 27-inch monitor may include a first and second wireless transmitters in two opposite corners. As a result, the primary device may determine a height of the monitor, a tilt level of the monitor, and a swivel level of the monitor based on the signals emitted by the two wireless transmitters. In other examples, a desk may include a first and a second wireless transmitters in two opposite corners, the wireless transmitters to determine an area available for distributing the secondary devices by calculating a surface of the desk based on the signals emitted by each of the first and second wireless transmitters. In some other examples, a chair may include a plurality of wireless transmitter distributed in movable elements of the chair, such as a seat, a back rest, and an armrest.

In some examples, secondary devices may transmit signals to the primary device via a BLUETOOTH low energy (BLE) protocol. BLUETOOTH low energy protocol enables to precisely determine a position of the secondary device with respect to the primary device at low power levels (for instance, a power value within a range from 0.01 W to 0.50 W). In some examples, to accurately determine a position of the secondary device with respect to the primary device, the primary device may comprise a controller to parse the signals received from the secondary devices. In some examples, the controller of the primary device may determine a type of secondary device using a universally unique identifier (UUID) associated with the received signal.

According to an example, a computing device may comprise a user interface, a receiver to receive signals associated with a plurality of secondary devices, and a controller. In an example, the receiver is to receive wireless signals (for instance, beacon signals) from the secondary devices via a BLUETOOTH low energy protocol. The controller of the computing device is to receive signals from the receiver, determine a location of the secondary devices and a type of the secondary devices based on the received signals, determine a workspace layout based on the determined locations and the type of peripherals, determine an ergonomic layout, and control the user interface to display a virtual map resenting changes over the workspace layout to obtain the ergonomic layout.

According to some examples, determine the location of the secondary devices may comprise parsing beacon signals received from the secondary devices to obtain received signal strength indication (RSSI) values and angle of arrival (AoA) values and determining the location based on the received signal strength indication (RSSI) values and the angle of arrival (AoA) values. In other examples, determine the type of secondary device may comprise parsing beacon signals to obtain universally unique identifiers (UUID) associated with the received signal and determining a type of device based on the universally unique identifiers (UUID).

Figure 3:
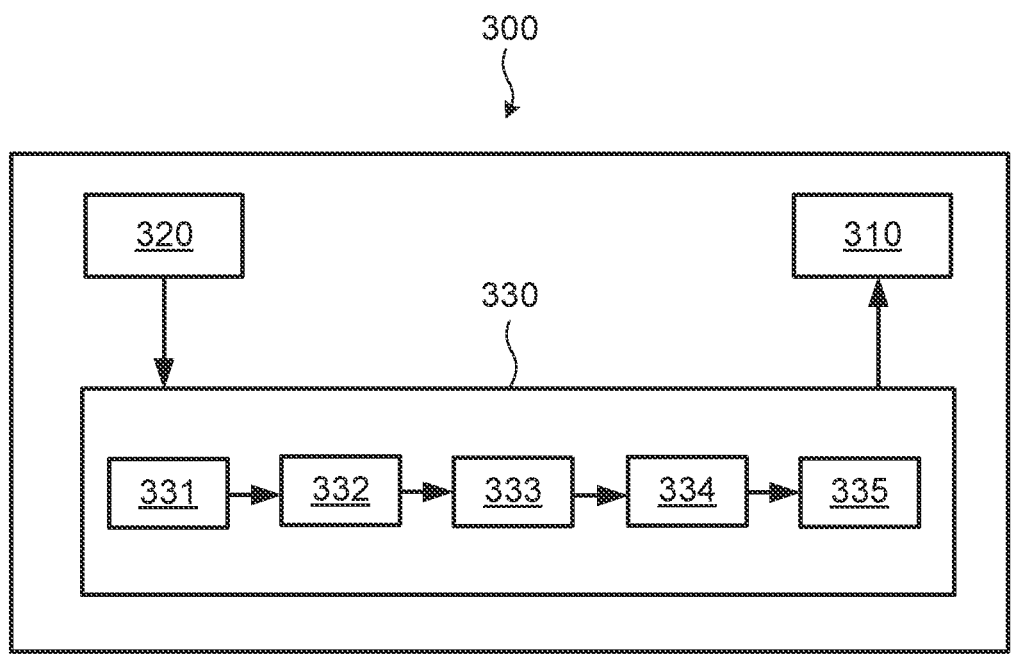
FIG. 3 shows a computing device comprising a user interface, a receiver, and a controller, according to an example of the present disclosure.

Referring now to FIG. 3, a computing device 300 comprising a user interface 310, a receiver 320, and a controller 330 is shown. The computing device 300 may be used for determining an ergonomic layout for a plurality of secondary devices wirelessly connected to the computing device 330. The user interface 310 of the computing device 300 may be in the form of a screen or display, the user interface 310 to display a virtual map representing the ergonomic layout for the plurality of secondary devices with respect to the primary device. In an example, the receiver 320 of the computing device is to receive signals emitted by the secondary devices via a BLUETOOTH low energy protocol. In other examples, the receiver 320 may correspond to a BLUETOOTH 5-based receiver (5.1, 5.2, or 5.3).

The receiver 320 of the computing device 300 is to receive signals associated with a plurality of secondary devices and the controller 330 is to execute the actions associated with blocks 331 to 335. At block 331, the controller is to receive signals from the receiver. In an example, the signals received by the receiver 320 may be beacon signals in a BLUETOOTH low energy protocol. At block 332, the controller 330 is to determine a location of the secondary devices and a type of secondary devices based on the received signals. As explained above, RSSI values, AoA values, and UUID associated with the signals may be used to determine a location and a type of secondary device. At block 333, the controller 330 is to determine a workspace layout based on the determined locations and the type of the peripherals. In an example, determining the workspace layout comprises distributing the secondary devices with respect to the computing device 330 based on the locations determined at block 332. Then, at block 334, the controller 330 is to determine an ergonomic layout in which the secondary devices are arranged with respect to the computing device 300 in accordance with a set of ergonomic rules associated with the type of secondary devices. In some examples, the set of ergonomic rules may correlate different types of secondary devices to ergonomic positions of the devices with respect to the primary device. In an example, the set of ergonomic rules may be in the form of a look-up table (LUT). At block 335, the controller 330 is to control the user interface 310 to display a virtual map representing a set of changes over the workspace layout to obtain the ergonomic layout. The virtual map may define a three-dimension positioning for each of the secondary devices with respect to the computing device 300.

In some examples, determine an ergonomic layout at block 334 may comprise the controller 330 to determine an ergonomic score associated with the workspace layout based on the type of secondary devices and their locations within the workspace layout and the controller 330 to determine a set of changes over the workspace layout to increase the ergonomic score over a threshold ergonomic score. In some examples, the set of changes may be determined such that the overall number of changes over the workspace layout is minimized while obtaining an ergonomic score equal to or above the threshold ergonomic score. In some other examples, the controller 330 may be further to compare the ergonomic score to a lower limit ergonomic score and control the user interface 310 to prompt a warning message upon the ergonomic score is lower than the lower limit ergonomic score. In some examples, the bottom limit ergonomic score may be associated with workspace layouts that may represent a short-term hazard to the health of a user of the computing device 300. For instance, the lower limit ergonomic score may be associated with workspace layouts in which the configuration and positioning of the secondary devices greatly differ from the ergonomic layout.

In some other examples, the receiver 320 of the computing device 300 of FIG. 3 may receive multiple signals from the secondary devices over a period of time. In an example, the receiver 320 is further to receive subsequent signals associated with the plurality of secondary devices after a period of time, and the controller 330 is further to receive the subsequent signals from the receiver 320, determine subsequent locations based on the subsequent signals, determine a subsequent workspace layout based on the subsequent locations and the types of secondary devices, and control the user interface 310 to prompt a warning message when the subsequent layout is different than the ergonomic layout.

According to some examples, a system for determining an ergonomic layout may be used to prevent users from bad postures when using primary and secondary devices. In an example, the system may comprise a plurality of devices, each of the devices comprising at least one wireless transmitter (for instance, a BLUETOOTH low energy transmitter). The system further comprises a receiver to receive signals emitted by the wireless transmitters of the plurality of devices. In an example, the receiver may correspond to a BLUETOOTH 5-based receiver (5.1, 5.2, or 5.3). In an example, the receiver may include a plurality of antennas so as to determine an angle of arrival (AoA) of the signals emitted by the wireless transmitters. The system further comprises a controller operatively connected to the receiver, the controller to parse the signals received from the plurality of devices via the receiver and to output a virtual map representing an ergonomic layout including the plurality of devices. In some examples, the controller may determine the ergonomic layout by determining arranging the plurality of devices such that an ergonomic score associated with the devices is greater than a threshold ergonomic score.

Figure 4:
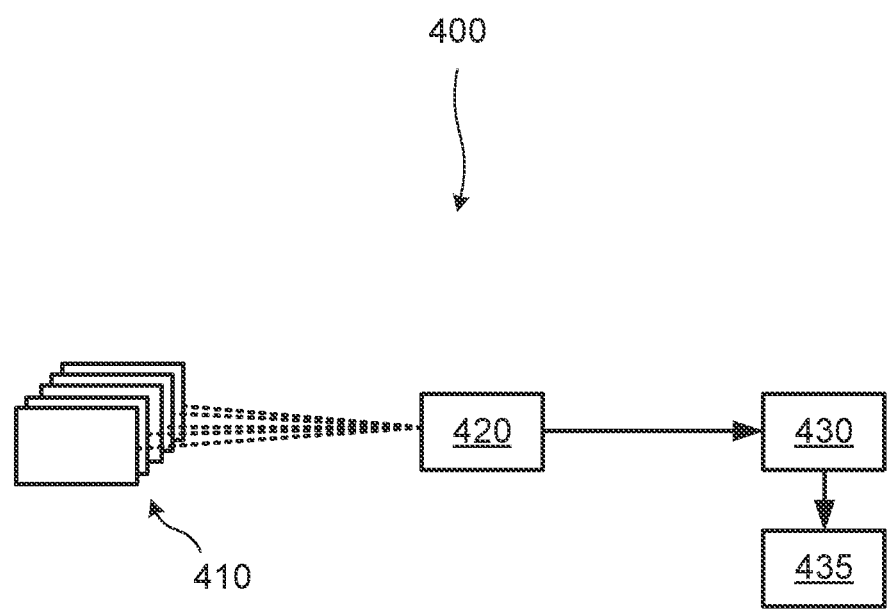
FIG. 4 shows a system for determining an ergonomic layout, according to an example of the present disclosure.

Referring now to FIG. 4, a system 400 for determining an ergonomic layout for a plurality of devices 410 is shown. The system 400 comprises a plurality of devices 410, a receiver 420, and a controller 430 operatively connected to the receiver 420. In the system 400, each of the devices of the plurality of devices 410 comprises at least one wireless transmitter. In some examples, the wireless transmitter may correspond to a BLUETOOTH low energy transmitter, as previously explained in reference to FIGS. 1 to 3. The receiver 420 of the system 400 is to receive signals emitted by the wireless transmitters of the plurality of devices 410. In FIG. 1, the signals emitted by the wireless transmitters towards the receiver 420 have been represented using a dashed line.

The controller 430 may be operatively connected to the receiver 420 via a wired connection or a wireless connection. In some examples, the controller 430 may be implemented in a cloud-based server, and the receiver 420 may transmit signals to the controller over a network (e.g., an internal network or Internet). In some other examples, as previously explained in reference to FIG. 3, the receiver 420 and the controller 430 may belong to the same device (e.g., a computing device). The controller 430 of the system 400 is to receive signals from the receiver 420. Also, the controller 430 is to parse each of the received signals to determine a type of device and a device location. Based on the determined types of devices and the determined locations, the controller 430 is to create an ergonomic layout. As previously explained, the ergonomic layout arranges the plurality of devices 410 such that a set of ergonomic rules associated with each type of device is complied with. Then, the controller 430 is to output a virtual map 435 representing the ergonomic layout.

In some examples, the wireless transmitters of the plurality of devices 510 are to emit signals to receiver 420 via a BLUETOOTH low energy protocol and the receiver 420 is a BLUETOOTH 5.1 receiver. As previously explained, BLUETOOTH 5.1-based receivers may determine a type of device by determining a universally unique identifier (UUID) associated with the signal, a distance from a transmitter to the receiver 420 by determining a received strength signal indication (RSSI) value and an angular position of the transmitter with respect to the receiver by determining an angle of arrival (AoA) value. In some examples, a device may include multiple wireless transmitters so as to enable the controller 430 to determine a position of the device (for instance, tilt level or swivel level) with respect to the receiver 420. In some examples, at least one device of the plurality of devices comprises wireless transmitters on opposite edges of the device.

As explained above, in some examples, the ergonomic layout may be created based on user data, the user data comprising at least one of a user's preferred location, a user's height, a user's wingspan, and a user's preferred configuration. In an example, the creation of the ergonomic layout may be based on the determined types of devices, the determined locations, and the user data. In some other examples, the system 400 may further comprise a user interface operatively connected to the controller 430. In an example, the user interface may comprise a text field to enter user data as input text. In other examples, the controller is to output the virtual map 435 comprises the controller 420 to control the user interface is to display the virtual map 435. When the controller 430 is implemented in a cloud-based server, the controller 430 may transmit data to the user interface over a network (for instance, an internal network of the Internet).

Figure 5A:
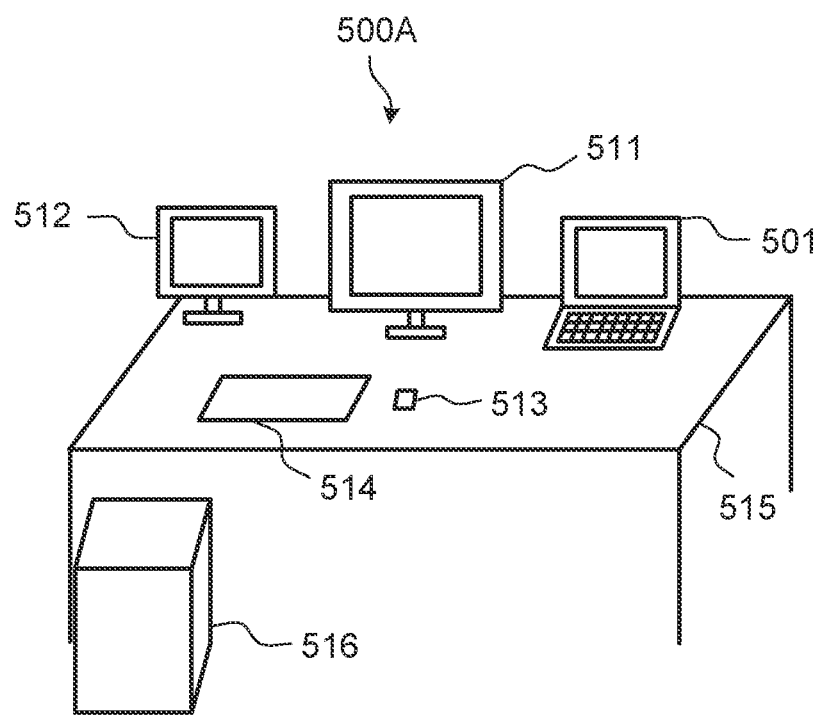
FIG. 5A shows a workspace layout including a plurality of devices, according to an example of the present disclosure.

Referring now to FIG. 5A, a workspace layout 500A including a plurality of devices is shown. The plurality of devices may correspond, for instance, to the plurality of devices 410 previously explained in FIG. 4. main device and a plurality of secondary devices. The plurality of devices comprises a primary device and a set of secondary devices. The primary device is a computing device 501 and the set of secondary devices comprises a first monitor 511, a second monitor 512, a mouse 513, a keyboard 514, a desk 515, and a stool 516. In other examples, additional or fewer secondary devices may be part of the workspace layout 500A. Likewise, in other examples, the plurality of devices may include other types of devices. In particular, the plurality of devices may comprise a computing device and at least one of a keyboard, a mouse, a lamp, a chair, an armrest of a chair, a backrest of a chair, a seat of a chair, a desk, a docking station, a monitor, a monitor support, speakers, headphones, a microphone, a printer, and a smartphone. In an example, the computing device 501 may correspond to the computing device 300 previously explained in reference to FIG. 3.

In the workspace layout 500A, the plurality of devices is distributed in accordance with the user's preferences. As previously explained, in some examples, the workspace layout 500A selected by the user may adversely affect to the user's health. To check the ergonomics of the workspace layout 500A, each of the secondary devices may be equipped with a wireless transmitter. In an example, the wireless transmitter corresponds to a BLUETOOTH transmitter. On the other hand, the computing device 510 (i.e., the primary device) comprises a receiver to receive the signals emitted by each of the secondary devices. In some examples, a secondary device may include multiple wireless transmitters to accurately define a position of the device in the workspace layout 500A. For instance, whereas the mouse 513 and the keyboard 514 may include a single wireless transmitter, the first monitor 511, the second monitor 512 and the desk 515 may include multiple wireless transmitters. In an example, the monitors 511 and 512 may have wireless transmitters in opposite corners (for instance, the upper-right corner and the lower-left corner). By having available multiple transmitters in the monitors 511 and 512, the swivel level and the tilt level for the monitors 511 and 512 may be determined. Likewise, desk 515 may include wireless transmitters in opposite corners to define an available surface along which secondary devices can be distributed.

As previously explained, the controller of the computing device 501 (i.e., the primary device) may determine a type of secondary device associated with a received signal by parsing the signal and determining a universally unique identifier (UUID) value. Likewise, the controller may determine a type of secondary device associated with a received signal by parsing the signal and determining a received strength signal indication (RRSI) value and an angle of arrival (AoA) value. In some examples, a type of secondary device may be associated with a number of degrees of freedom. For instance, in FIG. 5A, the mouse 513 and the keyboard 514 have three degrees of freedom. In an example, desk 515 may be a desk adjustable in height, and the movement of desk 515 has four degrees of freedom. Likewise, stool 516 may be adjustable in height, and its movement may have four degrees of freedom. So as to effectively position the seat of stool 516, the wireless transmitter may be positioned a bottom surface of the seat.

Figure 5B:
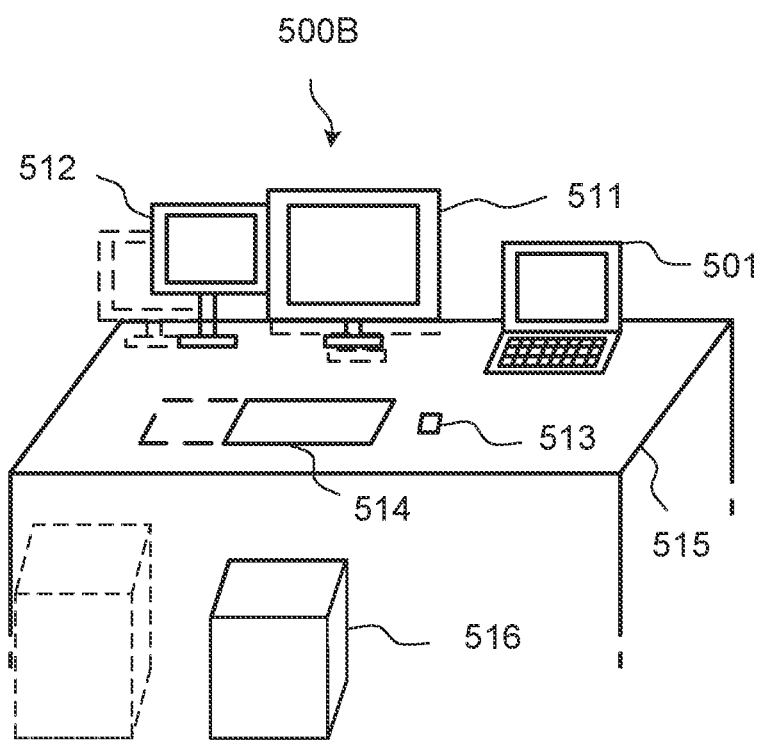
FIG. 5B shows an ergonomic layout for the plurality of devices of FIG. 5A.

Referring now to FIG. 5B, an ergonomic layout 500B for the plurality of devices of FIG. 5A is shown. The ergonomic layout 500B may be determined by a controller of the computing device 501 (i.e., the primary device). To determine the ergonomic layout 500B, the controller of the computing device 501 may determine a plurality of locations for the plurality of devices. As previously explained in FIG. 5A, the locations and the type of devices may be determined using the signals emitted by the wireless transmitters included in the plurality of devices and received via a receiver of the computing device 501. In some examples, an overall ergonomic score may be determined for the primary device (i.e., the computing device 501) and the secondary devices (i.e., the monitors 511 and 512, a mouse 513, a keyboard 514, a desk 215, and a stool 516). As explained above, the ergonomic score for a secondary device may be determined based on a relative position of the device with respect to the primary device. Based on the type of device, an ergonomic score for the secondary device is determined. By aggregating the ergonomic scores of the secondary devices, the overall ergonomic score is obtained.

In FIG. 5B, the ergonomic layout 500B has the secondary devices in a second, different, position compared to the positions of the secondary devices in the workspace layout 500A. In an example, the second position may be determined by applying a set of ergonomic rules to each of the devices. In some examples, the controller of the computing device 501 may determine a set of changes over the workspace layout 500A to obtain the ergonomic layout 500B. In an example, the set of changes may be determined such that the overall ergonomic score of the resulting layout is over a threshold ergonomic score. In other examples, the set of changes may be determined such that each ergonomic score associated to each of the devices is greater than a threshold ergonomic score.

The plurality of devices in the ergonomic layout 500B is represented in a solid line and the location of the plurality of devices in the workspace layout 500A is represented in a dashed line. Regarding the set of changes, the ergonomic layout 500B indicates that the configuration of the devices 511, 512, 513, 514, 515, and 516 is to be modified. For instance, in regards the monitors 511 and 512, the first monitor 511 is closer to the edge of the desk 515 in the ergonomic layout 500B than in the workspace layout 500A and the position of the second monitor 512 and its height has been modified. With respect to the mouse 513 and the keyboard 514, both devices have been moved to a location closer to the right edge of desk 515. In regards the desk 515, its height has been adjusted to an ergonomic position based on the anthropometric characteristics of the user (e.g., user's height or user's leg length). Similarly, in regards the stool 516, its location has been modified such that the user of the plurality of devices is centered with respect to the computing device 501 and the monitors 511 and 512. Also, the seat of stool 516 has been modified to lower the seat in accordance with the user's anthropometric characteristics.

Although the workspace layout 500A and the ergonomic layout 500B comprise a plurality of devices including multiple monitors, a desk 515, a keyboard 514, a mouse 513, and a stool 516, it should be noted that in other examples, the plurality of devices may comprise additional, fewer, or different devices.

As previously explained, in some examples, the ergonomic layout 500B may be represented in the form of a virtual map. In an example, the virtual map defines a three-dimension positioning for each of the secondary devices with respect to a computing device (i.e., a primary device). Also, in some examples, a set of changes over the workspace layout 500A to obtain the ergonomic layout 500B may be determined (for instance, by carrying out method 100, by using the computing device 300, or the system 400).

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims (and their equivalents) in which all terms are meant in their broadest reasonable sense unless otherwise indicated.

What is claimed is:

1. A method comprising:
   detecting a plurality of secondary devices via one or more wireless transmitters secured to the plurality of secondary devices;
      determining characterizing data for each of the detected secondary devices, the characterizing data comprising a type of secondary device and a location of the secondary device with respect to a primary device;
      receiving beacon signals from the one or more transmitters secured to the plurality of secondary devices via a receiver within the primary device;
      parsing the received beacon signals from the one or more transmitters secured to the plurality of secondary devices to obtain received signal strength indication values for the received signals, angle of arrival values for the received signals, and universally unique identifiers associated with the received signals;
      inputting one or more anthropometric characteristics of a user into a workspace profile;
      determining a workspace layout for the primary device and the plurality of secondary devices based on the locations of the secondary devices with respect to the primary device;
      determining an ergonomic layout in which the primary device and the plurality of secondary devices are distributed in accordance with the type of secondary device and the one or more anthropometric characteristics inputted into the workspace profile;
      comparing the ergonomic layout to the workspace layout; and
      determining a set of changes for the plurality of secondary devices based on a difference between the ergonomic layout and the workspace layout.

2. The method of claim 1,
   wherein determining characterizing data comprises:
      determining the type of secondary device based on the universally unique identifier, and
      determining the location of the secondary devices based on the received signal strength indication values and the angle of arrival values.

3. The method of claim 1, wherein determining an ergonomic layout comprises:
   generating one or more workspace boundaries based on the workspace profile;
   for each of the secondary devices, determining a range of ergonomic positions based on the type of the secondary device; and
   for each range of ergonomic positions, determining an ergonomic location for the secondary device within the ergonomic layout based on the workspace profile.

4. The method of claim 1, further comprising displaying the set of changes for the plurality of secondary devices in a user interface.

5. A computing device comprising:
   a user interface;
   a receiver to receive signals from a plurality of transmitters associated with a plurality of secondary devices, the receiver positioned within the computing device; and
   a controller to:
      receive signals from the receiver,
      determine a location of the secondary devices and a type of secondary devices based on the received signals,
      determine a workspace layout based on the determined locations and the type of the secondary devices,
      determine an ergonomic layout in which the secondary devices are arranged with respect to the computing device in accordance with a set of ergonomic rules associated with the type of secondary devices, and
      control the user interface to display a virtual map representing a set of changes over the workspace layout to obtain to the ergonomic layout;
   wherein the user interface permits a user to input one or more anthropometric characteristics of a user into a workspace profile; and
   wherein the controller generates one or more workspace boundaries based on the workspace profile.

6. The computing device of claim 5, wherein the virtual map defines a three-dimension positioning for each of the secondary devices with respect to the computing device.

7. The computing device of claim 5, wherein determine the ergonomic layout comprises:
   determine an ergonomic score associated with the workspace layout based on the type of secondary devices and the determined locations, and
   determine a set of changes over the workspace layout to increase the ergonomic score over a threshold ergonomic score.

8. The computing device of claim 7, wherein the controller is further to:
   compare the ergonomic score associated with the workspace layout to a lower limit ergonomic score, and
   control the user interface to prompt a warning message upon the ergonomic score is lower than the bottom limit ergonomic score.

9. The computing device of claim 5, wherein the receiver is further to receive a subsequent signals associated with the plurality of secondary devices after a period of time, and the controller is further to:
   receive the subsequent signals from the receiver, determine subsequent locations based on the subsequent signals,
   determine a subsequent workspace layout based on the subsequent locations and the types of the secondary devices, and
   control the user interface to prompt a warning message when the subsequent workspace layout is different than the ergonomic layout.

10. A system for determining an ergonomic layout, the system comprising:
    a plurality of secondary devices, each of the secondary devices comprising one or more wireless transmitters;
    a primary device, the primary device including a receiver positioned within the primary device, the receiver to receive signals emitted by the wireless transmitters of the plurality of secondary devices; and a controller operatively connected to the receiver, wherein the controller is to:
monitor signals sent to the receiver from the one or more wireless transmitters;
parse each of the signals to determine a type of secondary device and a secondary device location with respect to the primary device,
create an ergonomic layout based on the determined types of devices and the determined locations, and
output a virtual map representing the ergonomic layout;
wherein the primary device includes a user interface to allow a user to input one or more anthropometric characteristics of a user into a workspace profile; and
wherein the controller generates one or more workspace boundaries based on the workspace profile.

11. The system of claim 10, wherein the wireless transmitters of the plurality of secondary devices emits signals to the receiver via a Bluetooth 5.1 communication protocol and the receiver is configured to communicate using the Bluetooth 5.1 communication protocol.

12. The system of claim 10, wherein the one or more anthropometric characteristics includes at least one of a user's preferred location, a user's height, a user's wingspan, and a user's preferred configuration.

13. The system of claim 12, wherein the user interface includes a text field to enter user data as input text.

14. The system of claim 10, wherein each of the plurality of secondary devices includes two or more wireless transmitters.

15. The system of claim 10, wherein each of the one or more wireless transmitters continuously transmit location data to the receiver, and wherein location data includes signal strength indication values and angle of arrival values received by the receiver.

* * * * *